United States Patent [19]

Smith

[11] 4,310,941
[45] Jan. 19, 1982

[54] CABLE AND BATTERY TERMINAL CLEANER

[76] Inventor: James J. Smith, 421 Sixth Ave., Lindenwold, N.J. 08021

[21] Appl. No.: 130,829

[22] Filed: Mar. 17, 1980

[51] Int. Cl.³ .......................... A46B 9/08; A46B 13/08
[52] U.S. Cl. ........................................ 15/160; 15/180
[58] Field of Search ................ 15/180, 198, 200, 106, 15/160, 28, 21 R

[56] References Cited

U.S. PATENT DOCUMENTS

| 1,684,481 | 9/1928 | Exley | 15/198 |
| 2,421,647 | 6/1947 | Peterson | 15/180 |
| 2,629,121 | 2/1953 | Petre | 15/200 X |
| 2,982,983 | 5/1961 | Peterson | 15/180 |

*Primary Examiner*—Peter Feldman

*Attorney, Agent, or Firm*—Duffield & Lehrer

[57] ABSTRACT

A cable and battery terminal cleaner particularly adapted for cleaning the terminals of a side post storage battery and the cable ends attached thereto includes a substantially cylindrically shaped housing. An annular row of wire bristles extends from one end of the housing. Within the row of bristles and extending outwardly beyond the ends of the bristles is a pilot pin which is adapted to fit within the bolt hole of a terminal to act as a guide for rotary movement of the cleaner. The pin may also be pushed inwardly against a spring so that the end of a bolt may enter the opening at the end of the housing to also act as a guide when a cable end is being cleaned. A socket is located on the remote wall of the housing for connecting the entire cleaner to a rotary power tool if desired.

2 Claims, 6 Drawing Figures

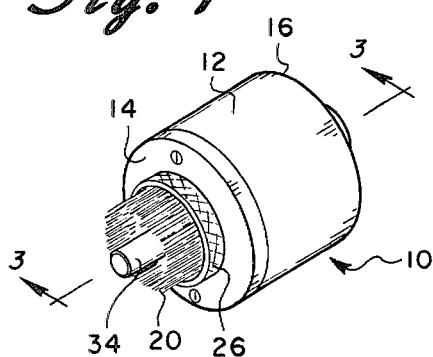
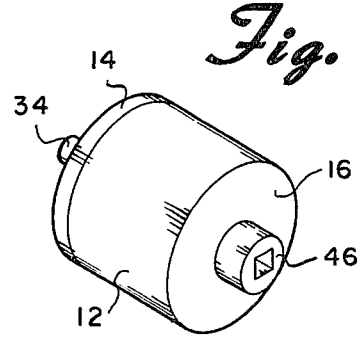
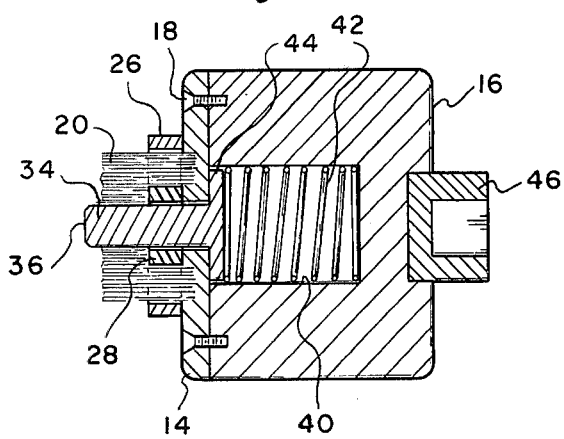
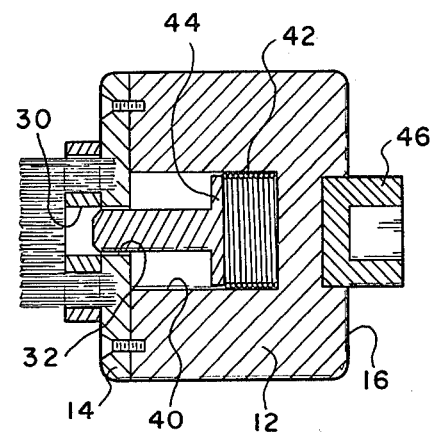
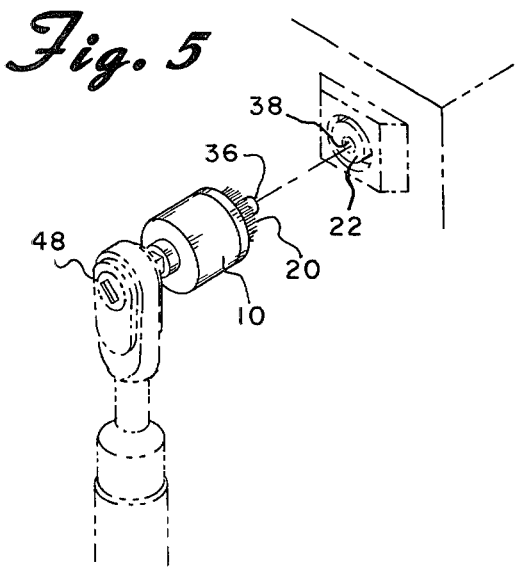
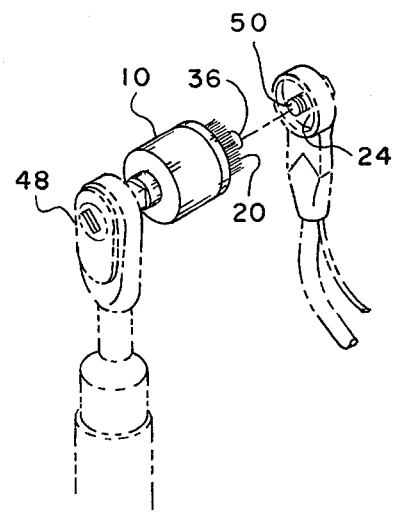

CABLE AND BATTERY TERMINAL CLEANER

BACKGROUND OF THE INVENTION

The present invention is directed toward a cable and battery terminal cleaner and more particularly to such a device which is adapted to clean the terminals of a side post storage battery and the cable ends which are adapted to be attached to the battery terminals.

As is well known in the art, when an automotive storage battery is in use, corrosion and deposits tend to build up around the terminals thereof. This corrosion could build up very quickly and eventually will interfere with the operation of the battery. That is, power from the battery to the cable may become substantially reduced and quite often will eventually not pass at all.

Until recently, conventional automotive storage batteries had their terminals extending upwardly from the top of the battery. These terminals were normally made of lead or similar metal and were generally cylindrically or slightly conically shaped. The cables were attached to the terminals by clamp-like elements at the end of the cables which fit around the terminal and were then tightened.

When the battery posts and cables needed cleaning, the cables were removed from the posts and a wire brush which had been particularly designed for the purpose was used to clean the exterior cylindrical surface of the battery post and the internal cylindrical surface of the cable end. These devices which are shown, for example, in U.S. Pat. Nos. 1,838,958; 3,088,150 and 3,383,727 include radially inwardly extending wire bristles for cleaning the battery posts and outwardly extending wire bristles which are adapted to be drawn through the cable end for cleaning the internal cylindrical surface thereof.

In recent years, a new type of battery post has been introduced and apparently will eventually replace all of the older "post" type batteries. These newer batteries differ in two basic respects. Firstly, the terminals are mounted on the side of the battery rather than on the top thereof. Secondly and more importantly, the structure of the terminals is entirely different.

The battery side terminals are comprised essentially of a substantially flat annular surface having a washer-like appearance. The hole at the center of the terminal which extends into the battery has a screw thread thereon. The cable end has a similar washer-like appearance and includes a bolt passing through the opening at the center thereof. In most cases, the bolt is free to rotate but is axially immovable. The cable end is connected to the battery terminal by screwing the bolt into the opening in the middle of the terminal until the two flat annular surfaces of the cable end and the battery terminal are in tight contact.

While these side mounted terminals do not need cleaning as often as the conventional top mounted battery posts, they do frequently get dirty and need cleaning. They cannot, however, be cleaned with conventional battery post cleaners such as those described above. To the best of Applicant's knowledge, there has been one attempt to provide a tool for cleaning the new cable ends and side mounted battery terminals. This device is a cylindrically shaped block having a plurality of bristles extending axially from one end thereof in a substantially annular configuration.

This cleaning device is intended to be used by placing the ends of the wire bristles against the battery terminal and thereafter rotating the device. It is extremely ineffective, however, since there is no guide means of any nature for maintaining the cleaning device in axial alignment with the terminal. As a result, when the device is rotated, it frequently moves radially off of the terminal. Applicant is aware of no cleaning device which is simple in construction and use and which adequately cleans both the battery side terminal and the cable ends.

SUMMARY OF THE INVENTION

It is believed that the present invention overcomes all of the deficiencies of the prior art devices discussed above and provides a cable and battery terminal cleaner which is particularly adapted for cleaning the terminals of a side post storage battery and the cable ends which are intended to be attached thereto. The device of the present invention includes a substantially cylindrically shaped housing having an annular row of wire bristles extending from one end of the housing. Within the row of bristles and extending outwardly beyond the ends of the bristles is a pilot pin which is adapted to fit within the bolt hole of a terminal to act as a guide for rotary movement of the cleaner. The pin may also be pushed inwardly against a spring so that the end of a bolt may enter the opening at the end of the housing to also act as a guide when a cable end is being cleaned. A socket is located on the remote wall of the housing for connecting the entire cleaner to a rotary power tool if desired.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front perspective view of a cable and battery terminal cleaner constructed in accordance with the principles of the present invention;

FIG. 2 is a rear perspective view thereof;

FIG. 3 is a cross-sectional view taken through the lines 3—3 of FIG. 1;

FIG. 4 is a view similar to FIG. 3 but showing the pilot pin in its retracted position;

FIG. 5 is an illustrative view showing the manner in which the present invention is used to clean a battery terminal, and FIG. 6 is an illustrative view showing the manner in which the device of the invention is utilized to clean a cable end.

DETAILED DESCRIPTION OF THE PREFERRED EMBODIMENT

Referring now to the drawings in detail wherein like reference numerals have been used throughout the various figures to identify like elements, there is shown in FIG. 1 a perspective view of a cable and battery terminal cleaner constructed in accordance with the principles of the present invention and designated generally as 10. The cleaner 10 has a substantially cylindrically shaped housing 12 having a substantially flat front wall 14 and a similarly flat rear wall 16. Walls 14 and 16 are parallel to each other and substantially perpendicular to the axis of the cylinder forming the housing 12.

As shown in FIG. 3, the front wall 14 of the cleaner 10 is substantially disc shaped and is removably attached to the end of the housing 12 by a plurality of screws 18. Alternatively, and as should become more apparent hereinafter, it would be possible to also have the rear wall 16 be removable or to have only the rear wall be removable.

Securely fixed to the front wall 14 and extending axially outwardly away from the housing 12 are a plurality of wire bristles 20. Wire bristles 20 are arranged in a substantially annular configuration. As should be readily apparent, the annular configuration of the wire bristles 20 is substantially complementary to the annular planar surface of the battery terminal 22 shown in FIG. 5 or the similar surface of the cable end 24 shown in FIG. 6. An outer cylindrically shaped bristle retaining member 26 is also mounted on the end wall 14 and extends axially in the direction of the bristles 20. Outer retainer 26 is somewhat shorter than the bristles 20 and tends to maintain the bristles in proper alignment. A similar cylindrically shaped inner bristle retainer 28 is also mounted on the end wall 14 within the circle of bristles 20. Thus, the bristles are relatively rigidly maintained between the inner and outer retainers 26 and 28.

Inner retainer 28 has a central opening 30 therein which, in conjunction with the opening 32 in the end wall 14, functions as a guide for axially movable pilot pin 34. In FIG. 3 the pilot pin 34 is shown in its fully outwardly extended position wherein the free end 36 extends beyond the ends of the bristles 20. The pilot pin 34 is preferably cylindrically shaped and has a diameter which is slightly less than the inner diameter of the bolt hole 38 in the center of the battery terminal 22 (see FIG. 5).

Located within the housing 12 and directly behind the opening 32 is a substantially cylindrically shaped chamber 40. This chamber 40 allows the pilot pin 34 to move inwardly toward the interior of the housing 12 to an extreme position such as shown in FIG. 4 wherein the free end 36 of the pilot pin 34 lies within the center opening 30 or 32. The pilot pin 34, however, is normally biased to its outwardly most position by coil spring 42. The rearwardly most end of the pin 34 is enlarged as shown at 44 which enlargement, in conjunction with the front wall 14, functions as a stop means for preventing outward movement of the pilot pin beyond the position shown in FIG. 3.

The device 10 of the present invention may be used either manually or with a rotary power tool such as an air or electric drill or the like. For this latter purpose, the rear wall 16 is provided with a socket member 46. The socket member 46 is adapted to fit onto a power tool such as shown at 48 (FIG. 5) so that the entire device 10 may be quickly rotated about its central axis by the power tool 48. It should be readily apparent that the center of the socket 46 is in substantially direct axial alignment with the guide pin 34 and that the annular arrangement of wire bristles 20 is coaxial therewith.

When it is desired to clean the terminal 22 of a side post battery, the cable is first disconnected therefrom by unscrewing bolt 50. The free end 36 of the pilot pin 34 is then inserted into the bolt hole 38 of the terminal 22. In this position, the ends of the wire bristles 20 directly overlie the flat annular surface of the terminal 22. The device 10 is then rotated about its own axis either manually or by a power tool 48 connected to the socket 46 while a moderate amount of pressure is asserted axially so as to force the bristles into contact with the surface being cleaned. After several rotations, the surface of the battery terminal should be sufficiently cleaned. The pilot pin 34 acts as a stabilizer to maintain the cleaning device in proper alignment with the terminal while the terminal is being cleaned.

If the bolt 50 can be removed from the cable end 24, then the exact same procedure may be utilized for cleaning the cable end. This is accomplished by inserting the pilot pin 34 into the bolt hole in the middle of the cable end and then rotating the entire cleaning device as described above. If, however, the bolt cannot be removed from the cable end, the free end 36 of the pilot pin is pushed against the free end of the bolt 50 and the pilot pin 34 begins to move rearwardly until the wire bristles 20 contact the annular surface of the cable end. In this position, the forward end of the bolt 50 will lie within the guide opening 30 and will function to maintain the components in proper alignment. The cleaner is then rotated in the manner described above until the annular surface of the cable end 24 is cleaned by the wire bristles 20.

In many cases, it is desirable to clean the battery terminals while the battery is mounted in the vehicle. In conventional post type batteries, this has never been a problem since the posts extend upwardly and there is plenty of space above the same for the cleaning tool. With side terminal batteries, however, there are many times when there is very little space between the terminals and adjacent parts of the vehicle. It is for this reason that the cleaner 10 of the present invention is relatively short, having an overall length dimension of approximately 3 inches. Thus, even with the power tool 48 connected thereto, the overall length is only approximately 3⅜ to 4 inches.

The present invention may be embodied in other specific forms without departing from the spirit or essential attributes thereof and accordingly, reference should be made to the appended claims rather than to the foregoing specification as indicating the scope of the invention.

I claim:

1. A cable and battery terminal cleaner for cleaning the plane annular surfaces of side battery post and cable terminals comprising:
    a substantially cylindrically shaped housing having an end wall including a central opening there through;
    a substantially cylindrically shaped inner guide extending outwardly from said end wall, said inner guide having a center opening in axial alignment with the opening in said end wall;
    a substantially cylindrically shaped outer guide extending outwardly from said end wall and being coaxial with said inner guide, an annular space remaining between said inner and outer guides, the free forward ends of said inner and outer guides terminating at substantially the same axial location;
    a plurality of wire bristles secured to said housing and extending outwardly from said end wall and perpendicular thereto, said bristles being arranged in a substantially annular configuration within said annular space;
    an axially movable pilot pin extending outwardly from said end wall in the same direction as said bristles and through said openings;
    means biasing said pilot pin forwardly so that it extends a distance beyond the free ends of said bristles;
    said pilot pin being movable toward the interior of said housing, the free end of said pilot pin lying inwardly of the free end of said inner guide when said pilot pin is moved fully toward the interior of said housing.

2. The device of claim 1 wherein said housing includes a second end wall remote from said first-mentioned end wall, a socket carried by said second end wall and being in axial alignment with said pilot pin.

* * * * *